3,385,806
PRODUCTION OF TIGHT FLEXIBLE
URETHANE FOAM
Frank E. Critchfield, Charleston, Benjamin F. James, St. Albans, and Curtis C. Barber, South Charleston, W. Va., assignors to Union Carbide Corporation, a corporation of New York
Filed Oct. 1, 1965, Ser. No. 491,969
5 Claims. (Cl. 260—2.5)

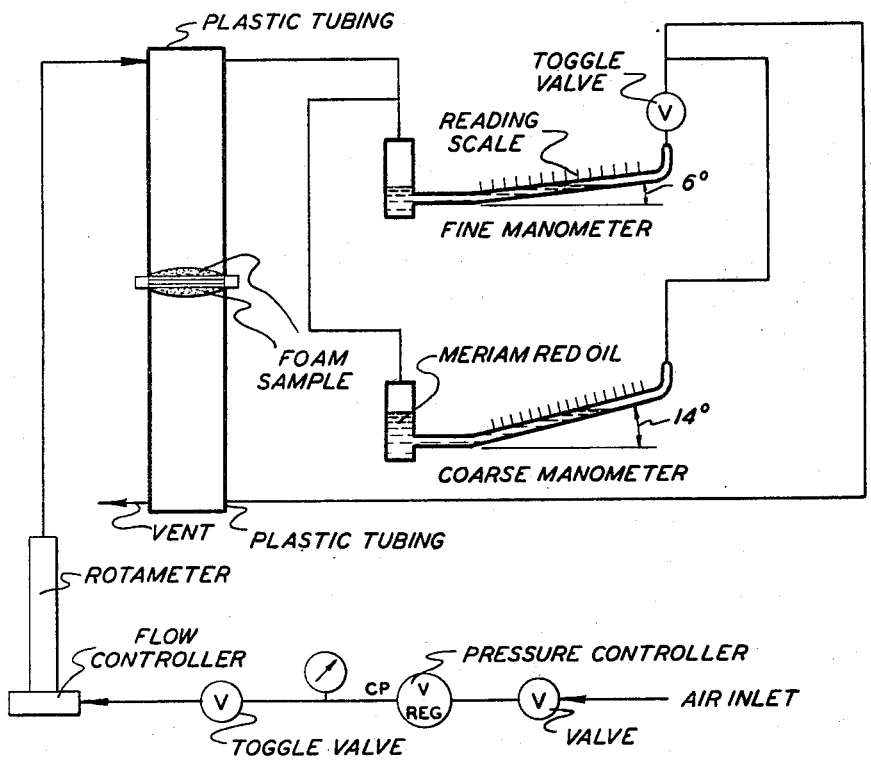

The invention relates to a process for the production of tight flexible urethane foam. In a particular aspect, the invention relates to the use of oxalic acid, or water-soluble salts thereof, in a process for producing flexible urethane foam.

Flexible urethane foam is normally produced as an open-celled structure through which gases can readily pass. In certain applications, however, it is desired to produce flexible urethane foam having relatively few open cells. Such foam, sometimes referred to as "tight" urethane foam, is useful in cushions, padding, and the like, where some insulative properties are also desired. Tight flexible urethane foams can be produced by employing relatively large proportions of catalyst. However, such an expedient is undesirable because the proportion of catalyst needed is highly critical (too high a catalyst level can cause shrinkage of the foam), and the use of high proportions of catalyst can have a deleterious effect on properties of the foam.

The present invention is based upon the discovery that the use of small amounts of oxalic acid or water-soluble salts thereof, in an otherwise conventional flexible urethane foam formulation, results in the production of flexible urethane foam having a high proportion of closed cells. Accordingly, the invention provides a process which comprises reacting a polyol with a polyisocyanate in the presence of a foaming agent, a catalyst, and a small amount of oxalic acid or water-soluble salts thereof. Many organic polyisocyanates can be employed in the process of the invention including 2,4-tolylene diisocyanate, 2,6-tolylene diisocyanate, crude tolylene diisocyanate, bis(4-isocyanatophenyl)methane, polyphenyl-methylene polyisocyanates that are produced by phosgenation of aniline-formaldehyde condensation products, dianisidine diisocyanate, bitolylene diisocyanate, xylylene diisocyanate, naphthalene diisocyanate, hexamethylene diisocyanate, bis(2-isocyanatoethyl) fumarate, bis(2-isocyanatoethyl) carbonate, and many other organic polyisocyanates that are known in the art, such as those that are disclosed in an article by Siefken Ann., 562, 75 (1949). In general, the aromatic polyisocyanates are preferred because of their greater reactivity. Aromatic diisocyanates are more preferred.

A wide variety of polyols can be employed in the process of the invention. For instance, one or more polyols from the following classes of compositions can be employed:

(a) Polyoxyalkylene polyols including alkylene oxide adducts of, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphonic acid, polyphosphoric acids such as tripolyphosphoric acid and tetrapolyphosphoric acid, phenol-anilineformaldehyde ternary condensation products, aniline-formaldehyde condensation products, and the like, are useful. The alkylene oxides employed in producing polyoxyalkylene polyols normally have from 2 to 4 carbon atoms. Propylene oxide and mixtures of propylene oxide with ethylene oxide are preferred.

(b) Polyesters of polyhydric alcohols and polycarboxylic acid such as those prepared from an excess of ethylene glycol, propylene glycol, 1,1,1-trimethylolpropane, glycerol, or the like reacted with phthalic acid, adipic acid, and the like, are useful polyols.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

(d) Phosphorus-containing derivatives such as tris(dipropylene)glycol phosphite and other phosphites are useful in urethane foams.

In producing flexible urethane foams, the polyol is preferably a triol or a mixture of a diol and a triol. The polyol or polyol mixture employed will normally have a hydroxyl number in the range of from about 40 to about 75. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH=hydroxyl number of the polyol
$f$=average functionality, that is average number of hydroxyl groups per molecule of polyol
M.W.=average molecular weight of the polyol The one-shot technique is preferably employed for the production of flexible urethane foams, although the prepolymer or the quasi-prepolymer techniques may be employed in some cases.

The amount of polyisocyanate employed will vary slightly depending upon the exact nature of the polyurethane foam being prepared. In general the total —NCO equivalent to total active hydrogen equivalent (i.e., hydroxyl plus water, if water is present) should be such as to provide a ratio of about 1 to 1.2 equivalents of —NCO per equivalent of active hydrogen, and preferably a ratio of about 1.05 to 1.1 equivalents of —NCO per reactive hydrogen.

A foaming agent is employed in the process of the invention. The foaming agent can be water (which is used in proportions of, for example, from about 0.5 to 5 weight percent of water, based on total weight of the reaction mixture), or the foaming agent can be a compound which is vaporized by the exotherm of the isocyanate-reactive hydrogen reaction, or a mixture of water and such compound. All of these foaming agents are known in the art. The preferred foaming agents are water and certain halogen-substituted aliphatic hydrocarbon which have boiling points between about −40° C. and 70° C., and which vaporize at or below the temperature of the foaming mass. Illustrative are, for example, trichloromonofluoromethane, dichlorodifluoromethane, dichloromonofluoromethane, dichloromethane, trichloromethane, bromotrifluoromethane, chlorodifluoromethane, chloromethane, 1,1-dichloro-1-fluoroethane, 1,1-difluoro-1,2,2-trichloroethane, chloropentafluoroethane, 1-chloro-1-fluoroethane, 1-chloro-2-fluoroethane, 1,1,2-trichloro-1,2,2-trifluoroethane, 2 - chloro-1,1,1,2,3,3,4,4,4-nonafluorobutane, hexafluorocyclobutene, and octafluorocyclobutane. Other useful foaming agents include low-boiling hydrocarbons such as butane, pentane, hexane, cyclohexane, and the like. Many other compounds easily volatilized by the exotherm of the isocyanate-reactive hydrogen reaction also can be employed. A further class of foaming agents includes thermally-unstable compounds which liberate gases upon heating, such as N,N'-dimethyldinitrosoterephthalamide.

The amount of foaming agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pounds per cubic foot respectively.

A catalyst is employed in the process of the invention for accelerating the isocyanate-reactive hydrogen reaction. Such catalysts include a wide variety of compounds. Among the most useful catalysts are the tertiary amines and the organic tin compounds. Specific illustrative tertiary amines include N-methylmorpholine, N-ethylmorpholine, N,N,N',N'-tetramethyl-1,3-butanediamine, N,N-dimethylethanolamine, 1,4-diazabicyclo[2.2.2]-octane, bis[2-(N,N-dimethylamino)ethyl] ether, and the like. Useful organic tin compounds include stannous acylates such as stannous octoate, stannous acetate, stannous oleate, and the like. Many combinations of catalysts can be employed, for instance, it is useful to employ one or two tertiary amines in combination with stannous octoate. The catalyst is employed in catalytic amounts such as from about 0.05 weight percent to about 2 weight percent, based on weight of polyol.

When producing flexible urethane foams, it is useful in many cases to employ a surfactant which serves as a stabilizer. Polysiloxane-polyoxyalkylene block copolymers are useful surfactants for this purpose. Among the polysiloxane-polyoxyalkylene block copolymers that are useful are those that are disclosed in U.S. Patents 2,834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunders and Frish, "Polyurethanes: Chemistry and Technology," Intersecience Publishers, New York. Part I, "Chemistry," was published in 1963 and Part II, "Technology," in 1964.

The major point of novelty of the subject invention resides in the use of oxalic acid or water-soluble salt thereof in an otherwise conventional flexible foam formulation. Thus, the process of the invention employs a small amount of oxalic acid (either hydrated or anhydrous), ammonium oxalate, alkali metal oxalate such as sodium oxalate, potassium oxalate, or other water-soluble salt of oxalic acid. The oxalic acid (or salt thereof) is employed in small amounts, for instance, from about 0.0005 to about 1 weight percent, and preferably from about 0.0025 to about 0.02 weight percent, based on weight of polyol. The oxalic acid additive is preferably added to the polyol reactant before foaming. It may be convenient to dissolve the oxalic acid in water before adding it to the polyol.

The invention is useful for the production of flexible urethane foams having a relatively large proportion of closed cells. Such foams have enhanced heat and sound insulation properties.

The practice of the invention is illustrated by the following examples:

EXAMPLES 1–30

A series of flexible urethane foams were produced by the one-shot technique from the following formulation:

|  | Parts, by weight |
|---|---|
| Polyol [1] | 100 |
| Water | 4 |
| Emulsifier [2] | 1.5 |
| N,N,N',N'-tetramethyl-1,3-butanediamine | 0.05 |
| Stannous octoate | 0.26 |
| Tolylene diisocyanate | 48.85 |
| Additive | As indicated |

[1] Propylene oxide adduct of glycerol having a hydroxyl number of 56.
[2] A siloxane-oxyalkylene block copolymer of the formula:

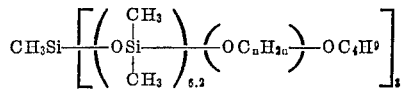

wherein the

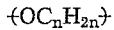

moiety represents a mixed oxyethylene-oxypropylene chain containing an average of about 18 oxyethylene groups and about 14 oxypropylene groups.

The table below displays the nature and proportion of additive employed for each experiment (proportion of additive is shown as parts by weight of additive per million parts by weight of polyol), and displays the breathability and the density of the foams produced. Breathability is an indication of the proportion of closed cells in a foam, with a higher number indicating a higher proportion of closed cells. The test procedure for determining breathability as as follows:

The breathability of flexible urethane foam

SCOPE

This test provides a comparative measure of the tightness, or conversely the degree of openness, of the cells of flexible plastic foam. A specimen of suitable size is incorporated in a gas flow system and the differential pressure that develops across the foam is measured.

APPARATUS (1) Constant temperature room maintained at ASTM conditions, 23±1° C. and 50±2% relative humidity.
(2) Test apparatus illustrated in FIGURE 1.
(3) Thickness gage such as Ames S4325 (ASTM D1564).

TEST SPECIMENS (a) The test specimens shall have parallel top and bottom surfaces and essentially perpendicular sides.
(b) Specimens shall be reduced to 4 by 4 by 1 inch.

PROCEDURE (a) Adjust the inlet air pressure controller so that a pressure of 20±½ lb. is maintained on the system.
(b) Adjust the air flow controller so that the rotameter reads 30. This is equivalent 2.15 cu. ft. of air per minute.
(c) Insert the test specimen between the two sections of plastic tubing and bring them together until movement of the manometer fluid ceases in the "fine" manometer. Note: if the differential pressure exceeds the limit of the fine manometer, close the valve so that the pressure may read on the "coarse" manometer.
(d) Record the scale reading, in millimeters on the "fine" manometer, or 2.4 times the reading on the "coarse"

manometer, as the relative differential pressure. Note: the reading so recorded times 0.00012 equals the differential pressure in p.s.i.

(e) Measure the thickness of the specimens to the nearest 0.01 inch.

(f) Report the recorded value (d) divided by the thickness as the breathability of the foam.

TABLE

| Ex. | P.p.m. | Acid (dissolved in water) | Breathability | Density |
|---|---|---|---|---|
| 1 | 0 | Control | 48 | 1.60 |
| 2 | 100 | Oxalic acid (dihydrate) | >600 | 1.42 |
| 3 | 100 | Succinic acid | 50 | 1.57 |
| 4 | 130 | ____do____ | 47 | 1.56 |
| 5 | 100 | Adipic acid | 41 | 1.55 |
| 6 | 162 | ____do____ | 46 | 1.58 |
| 7 | 100 | Maleic acid | 45 | 1.54 |
| 8 | 100 | Fumaric acid | 45 | 1.56 |
| 9 | 100 | Phthalic anhydride | 47 | 1.57 |
| 10 | 185 | ____do____ | 49 | 1.57 |
| 11 | 100 | Citric acid | 42 | 1.57 |
| 12 | 100 | Tartaric acid | 44 | 1.54 |
| 13 | 100 | Versene acid | 45 | 1.57 |
| 14 | 100 | Formic acid | 50 | 1.56 |
| 15 | 100 | Acetic acid | 51 | 1.56 |
| 16 | 100 | Benzoic acid | 52 | 1.55 |
| 17 | 100 | p-Aminobenzoic acid | 52 | 1.57 |
| 18 | 100 | Trimesic acid | 47 | 1.58 |
| 19 | 100 | Salicyclic acid | 47 | 1.560 |
| 20 | 100 | Glycine | 44 | 1.554 |
| 21 | 100 | Pyromellitic acid | 44 | 1.57 |
| 22 | 100 | Phosphoric acid | 26 | 1.57 |
| 23 | 100 | Boric acid | 53 | 1.56 |
| 24 | 100 | Sulfuric acid | 84 | 1.563 |
| 25 | 100 | Sodium Oxalate | >600 | 1.49 |
| 26 | 100 | L-Glutamic acid | 31 | 1.62 |
| 27 | 100 | Ammonium oxalate | >600 | 1.52 |
| 28 | 100 | Diethyl oxalate | 42 | 1.57 |
| 29 | 100 | Oxalic acid | >600 | 1.49 |
| 30 | 100 | Oxamide | 41 | 1.58 |

The unexpected ability of oxalic acid and water-soluble salts thereof to cause the formation of tight flexible urethane foams is apparent from the data displayed in the foregoing table.

What is claimed is:

1. A process for the production of flexible urethane foams having a high portion of closed cells which comprises reacting a polyoxyalkylene polyol with an organic polyisocyanate in the presence of a foaming agent, stannous acylate catalyst, a polysiloxane polyoxyalkylene block copolymer emulsifier, and from about 0.0005 to about 1 weight percent, based on weight of said polyoxyalkylene polyol of oxalicacid, ammonium oxalate, or alkali metal oxalate.

2. A process for the production of flexible urethane foams having a high portion of closed cells which comprises reacting a polyoxyalkylene polyol with an organic polyisocyanate in the presence of water, stannous octoate catalyst, a polysiloxane-polyoxyalkylene block copolymer emulsifier, and from about 0.0005 to about 1 weight percent, based on weight of said polyoxyalkylene polyol of oxalic acid.

3. A process for the production of flexible urethane foams having a high portion of closed cells which comprises reacting a polyoxyalkylene polyol with an organic polyisocyanate in the presence of water, stannous octoate catalyst, a polysiloxane-polyoxyalkylene block copolymer emulsifier, and from about 0.0005 to about 1 weight percent, based on weight of said polyoxyalkylene polyol of ammonium oxalate.

4. A process for the production of flexible urethane foams having a high portion of closed cells which comprises reacting a polyoxyalkylene polyol with an organic polyisocyanate in the presence of water, stannous octoate catalyst, a polysiloxane-polyoxyalkylene block copolymer emulsifier, and from about 0.0005 to about 1 weight percent, based on weight of said polyoxyalkylene polyol of sodium oxalate.

5. A process for the production of flexible urethane foams having a high portion of closed cells which comprises reacting a polyoxyalkylene polyol with an organic polyisocyanate in the presence of water, stannous octoate catalyst, a polysiloxane-polyoxyalkylene block copolymer emulsifier, and from about 0.0005 to about 1 weight percent, based on weight of said polyoxyalkylene polyol of potassium oxalate.

References Cited
UNITED STATES PATENTS
2,932,621    4/1960    Terry _____ 260—2.5

DONALD E. CZAJA, *Primary Examiner.*

LEON J. BERCOVITZ, *Examiner.*

H. S. COCKERAM, G. W. RAUCHFUSS, JR.,
*Assistant Examiners.*